United States Patent [19]

Bajorek

[11] 4,336,432
[45] Jun. 22, 1982

[54] INDUCTION HARDENING OF VALVE SEAT INSERTS

[75] Inventor: Benjamin T. Bajorek, Dearborn, Mich.

[73] Assignee: Ford Motor Company, Dearborn, Mich.

[21] Appl. No.: 188,448

[22] Filed: Sep. 19, 1980

[51] Int. Cl.³ .......................... H05B 6/38; C21D 1/10
[52] U.S. Cl. .................................. 219/10.41; 219/9.5; 219/10.57; 29/156.7 A; 29/447; 148/145
[58] Field of Search ................... 219/10.41, 10.43, 9.5, 219/8.5, 10.57, 10.73, 10.53; 29/156.7 A, 156.7 R, 447; 228/263 D, 127; 148/145, 146

[56] References Cited

U.S. PATENT DOCUMENTS

| | | | |
|---|---|---|---|
| 2,424,794 | 7/1947 | Brown | 148/10 |
| 2,444,259 | 6/1948 | Jordan | 219/13 |
| 2,757,268 | 7/1956 | Edwards | 219/10.75 |
| 2,914,641 | 11/1959 | Yuhasz | 219/9.5 |
| 3,022,407 | 2/1962 | Robinson et al. | 219/9.5 |
| 3,240,639 | 3/1966 | Lihl | 145/143 |
| 3,502,837 | 3/1970 | Peehs | 219/9.5 |
| 3,505,489 | 4/1970 | Tsuge et al. | 219/9.5 |
| 3,621,550 | 11/1971 | Colestock | 29/156.7 A |
| 3,737,612 | 6/1973 | Pfaffmann | 219/10.79 |
| 3,837,934 | 9/1974 | Pfaffmann et al. | 148/146 |
| 4,798,141 | 7/1957 | Longacre | 219/9.5 |

Primary Examiner—C. L. Albritton
Assistant Examiner—Philip H. Leung
Attorney, Agent, or Firm—Frank G. McKenzie; Donald J. Harrington

[57] ABSTRACT

An induction heating process for hardening a metal insert retained in a recess formed in a second component comprises the steps of fitting the insert in place within the recess by an interference fit, machining the interior surface of the insert, locating an induction heater adjacent the surface of the insert to be hardened, the heating element being spaced from the metal surface a predetermined distance, and energizing the heating element from the high frequency electrical power source for an extremely brief period.

9 Claims, 2 Drawing Figures

INDUCTION HARDENING OF VALVE SEAT INSERTS

BACKGROUND OF THE INVENTION

1. Field of the Invention

This invention relates to induction hardening of metals and more particularly to a method for hardening the surface of valve seat inserts by induction hardening and conduction quenching.

2. Description of the Prior Art.

In the manufacture of engine blocks for internal combustion engines it is common practice to heat inductively the generally conical valve seats formed integrally with the block. Thereafter, the heated valve seats are quenched to increase the hardness of the seats to reduce wear that results as poppet valves are operated against the valve seats. Generally, this induction heating process is accomplished by positioning a circular inductor directly opposite the conical surface of the valve seat and energizing the inductor by a high frequency electrical power source.

The valve seat for the exhaust valve in the engine head of an internal combustion engine must have an extremely high wear characteristic at high temperatures. This requirement is becoming more important in engines that use lead free gasoline because the absence of lead increases the amount of wear experienced by the valve seat and valve during operation. The pressure of lead compounds in the gasoline produces a lubricating effect on the surface of the valve seat. The problem is complicated further in engines having an aluminum head; aluminum is more susceptable of wear than is cast iron because it is softer. The hardening process in such engines must therefore be controlled to a closer tolerance of hardness than heretofore required with gray cast iron engine blocks and heads.

The need for a close control of the valve seat hardening process has been recognized in the automobile industry for some time. Aluminum head engines typically have valve seat inserts formed from a high strength and hardness material, for example, powdered or sintered formulations, either cast in place during the engine head casting process or installed in the aluminum head during a subsequent operation. When such inserts are used they must be machined while in place in the engine head to produce a close dimensional tolerance seat for the valve which will assure concentricity with the valve and the push rods. Because machining is required, the inserts are installed in the engine head in a metallurgically soft or annealed condition so that forming tools used during machining will wear at an acceptable rate, the machining operation can be done quickly and the insert will remain fixed in place in the engine head.

Normally, valve seat inserts are installed in the engine head by machining a bore in the head having a diameter that is 0.003–0.005 inches less than the outside diameter of the valve seat inserts. It has been found that by chilling the valve seat inserts to cryogenic temperatures before installation the inserts will be retained in the engine head during the machining operation and during the service life of the vehicle. However, when hardened inserts are installed by shrink fitting, subsequent machining was found to reduce the retention effect of the shrink fit. Consequently, the valve insert becomes prone to disengagement from the bore in the head either during machining or during an unacceptably short portion of the service life of the vehicle.

It has long been recognized in the art of induction hardening that the use of electrical energy in the radio frequency range will limit the depth to which the heat will penetrate the article to be hardened. For example, Brown (U.S. Pat. No. 2,424,794) has used electrical energy at radio frequencies as a source of heat and applies the heat to the surface of the work to be hardened by electromagnetic induction. The patent of Jordan (U.S. Pat. No. 2,444,259) describes a method for hardening irregularly shaped articles, particularly gear teeth, wherein a current having a frequency of 200 Khz is used to heat the tip portions of the gear teeth. It was recognized that by varying the frequency of the current various portions of the gear teeth can be heated selectively. Lower frequencies, for example, were found to be effective in heating the root areas of the teeth. The patent of Edwards (U.S. Pat. No. 2,757,268) describes a method for heating valve seats with the use of an electrical current whose frequency is on the order of 500 KHz. The patent of Lihl (U.S. Pat. No. 3,240,639) describes induction heating processes to obtain an improved microstructure for ferro-carbon alloys. Lihl understood that for a given time of exposure the choice of frequency may be used to control the amount of heat applied and the depth of penetration of the heat into the part to be hardened.

Whenever a ferritic material is hardened, an austenitic grain structure must appear before it is subsequently quenched to form the martensitic structure, the degree of whose presence is a function of the rate at which the material is quenched and the temperature to which the material is heated.

The concept of quenching valve seats by conducting heat away from the heated surface into the interior regions of the engine head rather than by a liquid quench is known in the art. Brown in U.S. Pat. No. 2,424,794 taught that the extreme heat developed during induction heating had to penetrate into the workpiece only a very short distance from the outer, heated surface. Instead of applying air, water or oil for quenching the heated material convectively, the heat was dissipated by conduction to the interior of the part being heated. This procedure for conduction quenching is taught also from U.S. Pat. Nos. 3,737,612 and 3,837,934.

Where the inductive heating process is applied to the surface to be hardened for a long period, distortion of the engine head is a recurring problem. Where the engine heads are formed of gray cast iron this distortion occurs to a particularly unacceptable degree.

When iron exhausts valve seats are press fitted, shrink-fitted or cast-in-place in an aluminum engine head there is a tendency for a later induction hardening process applied to the valve seats to reduce or to overcome the forces tending to retain the valve seat in the head. Subsequent machining operations of the hardened valve seats that produce concentricity and a surface complementary to the outer surface of the valve seat operate further to break the bond between the valve seat and the engine head. In operation, also, the extremely high temperatures of the exhaust gas passing at high velocity over the surface of the valve seat and engine head can cause the valve seat retention forces to be overcome if the engine head expands sufficiently due to thermal effects unless the retention forces between the head and the seat at room temperature are sufficiently high.

SUMMARY OF THE INVENTION

In accordance with the present invention, there is provided a method for hardening a ferrous valve seat located in a recess formed in a second metal component. The method comprises fitting the insert in place in the recess with an interference or force fit resulting from an interference between the recess and the outer surface of the insert. The interference fit can be produced by heating the second metal component with respect to the temperature at which the insert is fitted therewithin or by chilling the insert in relation to that reference temperature. Alternatively, the second metal component may be heated or the insert cooled sufficiently to overcome the mechanical interference and to allow the insert to be located within the recess. The parts are then allowed to attain an equilibrium temperature. When the insert is thus retained in the recess, the inner surface of the insert may be machined to produce a precise seating surface that receives the outer contour of the valve working within the engine head. Next, an induction heater is located adjacent the surface of the insert to be hardened, the heating element being spaced from the metal surface. The heating element is then energized with electrical energy from a high frequency alternating current source whose frequency is in excess of 200,000 Hz and preferably is at least 450,000 Hz. The induction heater is adapted to absorb power in the range between 20 and 40 kilowatts.

According to a second aspect of the present invention, the induction heater is energized for an extremely brief period. In this instance, for example, a gray cast iron insert mounted within an aluminum engine head can attain hardness on the Rockwell hardness scale sufficient to satisfy the criteria of engine operation even though the induction heater is energized for less than 0.60 seconds. It has been demonstrated that the optimal Rockwell hardness values are attained when the induction heater is energized under these conditions for only 0.30 seconds.

The force required to extract the valve seat insert from its location within the engine head after being positioned and hardened in place according to this method must satisfy the criteria for continuous operation for the life of the engine. It has been demonstrated that a sufficiently high insert retention force will be produced when a valve seat is retained and later hardened according to the present method to satisfy these criteria.

DESCRIPTION OF THE PREFERRED EMBODIMENT

Figure 1:
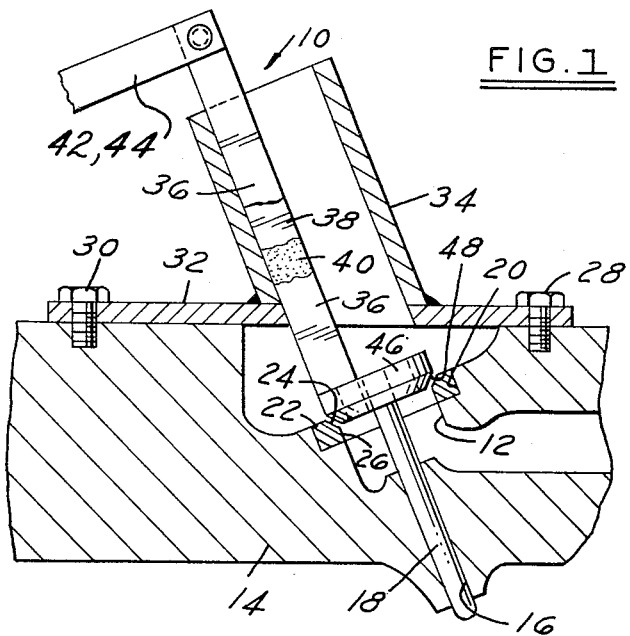
FIG. 1 is an elevation cross-section through the axis of an exhaust valve showing the induction heater in place above the inner surface of the valve inserts.

A high power induction heater for performing surface hardening on valve seat inserts is shown in FIG. 1. The induction heater 10 is shown located in position at the exhaust valve orifice 12 formed in the engine head 14, which in the usual application of the method according to this invention, is made of aluminum. Bore 16 is formed in the engine head to receive the valve stem and to perform a guiding operation as the valve is lifted from its seat. Before the valve is installed in the engine head, bore 16 is used to receive a pilot stem 18 formed integrally with the heater 10. After the hardening process is completed, bore 16 may act as a guide surface to locate the machining tool that forms the valve seat to its final configuration.

An annular recess 20 is formed at the end of the cylindrical surface of the exhaust valve orifice 12. The orifice is sized to receive a valve seat 22 that may be formed of gray cast iron or a powder iron formulation, either of which can be hardened sufficiently by the induction heating process, but soft enough to allow the valve seat to be machined. Conical surface 24 which is complementary to the outer surface of the valve, upon which the valve seats, and the cylindrical surface 26 of the valve seat are the surfaces that must be machined after the valve seat is located within the recess 20 in order to maintain a close tolerance fit with the valve.

The engine head is formed with tapped holes that receive attachment bolts 28–30 used to fix the induction heating fixture 10 to the engine head. The fixture includes a flat plate 32 that rests on the surface of the engine head and to which an intersecting cylindrical guide portion 34 is welded at the position that will align pilot stem 18 within the valve bore 16.

Induction heater 10 fits within guide 34 and consists of two buss type conductors 36, 38, separated by an insulator 40. The conductors are mechanically attached to intersecting conductors 42, 44, which are connected to the output of a high frequency power supply. The inner end of conductors 36, 38 are formed integrally with an annular induction heater element 46 having a conical surface 48 that is held, when the inductor is fixed in position, away from surface 24 of the valve seat a distance of between 0.030 and 0.060 inches.

The process for joining and hardening the valve seat, or any metal insert located in a recess formed in a second metal part, includes first machining the recess in the engine head to a dimension that would produce an interference fit with the outer diameter of the metal insert. Typically, the interference between the recess diameter and the outer diameter of the insert will be in the range between 0.003–0.005 inches. Usually, the insert is fitted within the engine head by cooling the insert to the temperature at which liquid nitrogen will freeze under standard conditions. Otherwise, the interference can be removed by heating the engine head to a high enough temperature above the temperature at which the parts will be fitted so that the interference is removed. Alternatively, the engine head can be heated and the metal insert cooled with respect to the temperature at which the parts are fitted together. When the temperature change has occured the metal insert or valve seat is placed within the recess 20 and the assembly is allowed to attain an equalibrium temperature.

The surfaces 24, 26 of the metal insert can be machined by locating a machining cutter within the engine head by means of the valve stem bore 16 and by rotating the cutter whose outer contour corresponds to the final shape of the seat. Because of the interference fit, the metal insert will be retained in position in the valve head without turning despite the effects of machining-induced forces and heat.

After the cutting tool is removed from the engine head the induction heater 10 is located again with respect to the machined surfaces 24, 26 with the aid of the valve stem bore 16. Conductors 42, 44 are connected to an electrical power supply operating at a frequency in excess of 200,000 cycles per second. Preferably the power supply will deliver energy with a frequency of approximately 450,000 cycles per second. The power supply should be capable of delivering 20 and 40 kilowatts. With the conical surface 48 of the annular heater element 46 held between 0.030 and 0.060 inches from the conical surface 24 of the valve insert, induction heater 10 is energized for a period between 0.20 and 0.50 seconds. The outer surface 24 of the insert will be heated to approximately 1,300 degrees Farenheit.

For this extremely short induction heating period, the heat energy produced at the surface of the insert is conducted through the insert, the thermally preloaded interface 20 at the outer diameter of the recess and into the body of the engine head, which being aluminum is readily able to conduct the heat from the insert. The conduction process, known as conduction quenching, cools the surface 24 and the body of the insert immediately below this surface from 1300° F. to 500° F. almost immediately following removal of the heat source. In this way, the gray cast iron of the insert is changed in the vicinity of surface 24 to a martensitic grain structure rather than to the softer pearlite or banite grain structures that are substantially softer than martensite. Conduction quenching produces a rapid cooling of the surface 24 because of the enormous size of the engine head in relation to the size of the valve insert and because of the favorable heat conduction properties of the engine head. Evidence of the rapidity of this conduction quenching process is found in the measurement of hardness of the insert. The insert hardness may reach up to Rockwell 67 for a depth of a 0.030 inches into the insert measured from surface 24.

A potential difficulty with this procedure is associated with the tendency for aluminum to expand due to thermal effects at a greater rate than the expansion that occurs in the valve insert material. This results because the aluminum head has a greater coefficient of thermal expansion than the gray cast iron material of the insert. Another factor is the nonuniform heating that results from the brief pulse of the induction heating applied to the surface of the valve insert. The temperature wave is conducted radially outwardly from the conical surface 24. At some point after the heater element is energized the aluminum head will be at a higher temperature than that of the insert. The effect of producing greater thermal strain in the engine head than in the insert tends to overcome the preload caused by the interference fit. It is essential that the preload not be overcome and that the insert be maintained within the recess throughout the life of the engine.

Figure 2:
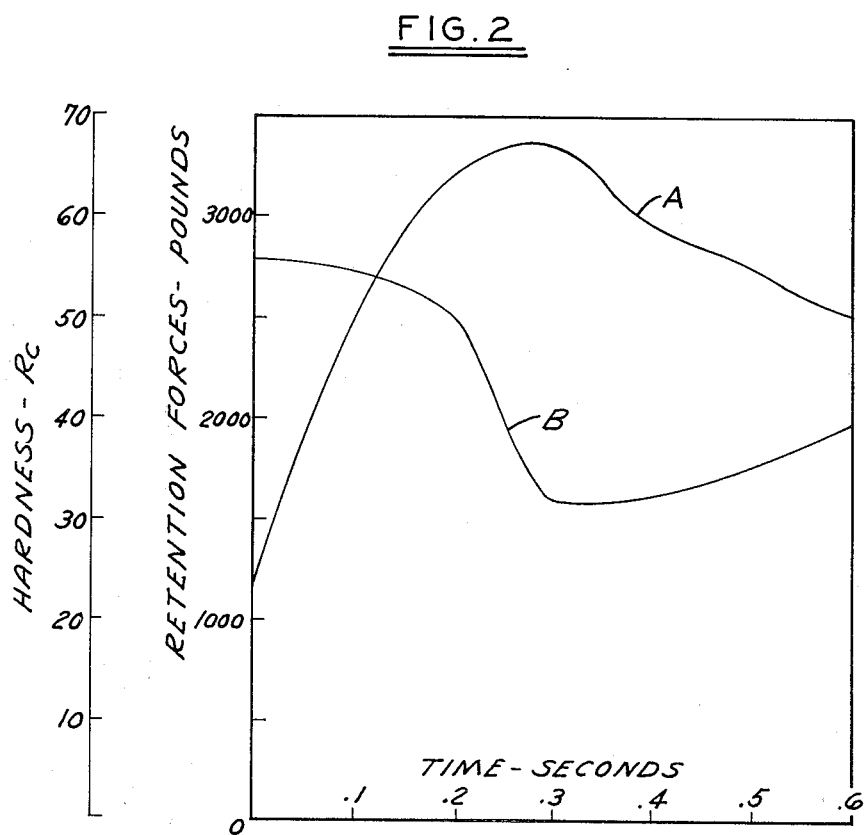
FIG. 2 shows the results of hardness testing of cast iron valve inserts after being hardened according to the method of this invention by an induction heater energized for periods lasting between 0.20–0.60 seconds. The insert retention forces are compared over the range of the heating periods.

FIG. 2 Curve A shows the results obtained from hardness measurements of valve inserts hardened by methods according to this invention wherein the induction heater was energized for varying periods lasting between 0.20 and 0.60 seconds. The hardness of the inserts presented as the mean hardness value of ten readings taken at random locations on the insert using a Leitz microhardness tester. Curved B of FIG. 2 shows for the same series of tests the retention force, or force required to remove the insert from its location within the recess of the engine head.

From Curve A of FIG. 2 it has been demonstrated that peak hardness values are attained when the induction heater is energized for only approximately 0.30 seconds. For heating periods greater or less than this value the Rockwell hardness values are less than the maximum value, but are sufficiently high to assure proper performance. From Curve B of FIG. 2, the retention force is seen to be greatest when no induction heating is applied to the test specimens as would normally be expected because the possibility of straining the aluminum engine block above the yield point is absent. However, the retention force is sufficiently high throughout the entire range of heating to assure proper retention of the insert in the engine head. The minimum value for retention force over the heating range tested occured when the induction heating period was 0.30 seconds. All of the retention force values obtained from this testing are sufficiently in excess of the criteria required for proper operation.

Changes and modifications in these specifically described embodiments and methods can be carried out without departing from the scope of the invention, which is intended to be limited by the scope of the appended claims. For example, any metal insert capable of being hardened by heat treatment when located in a heat sink that will allow rapid quenching of the insert following induction heating by conduction through the heat sink is contemplated by this invention. The invention is not intended to be limited solely to applications wherein a valve seat insert is fitted within and hardened in an aluminum engine head.

Having described the preferred embodiment of my invention what I claim and desire to secure by U.S. Letters Patent is:

1. A method for joining a metal insert located in a recess formed in a second component having a coefficient of thermal expansion greater than the metal from which the insert is made and for hardening the insert comprising the steps of:

fitting the insert in place in the recess by means of an interference fit;

machining the surface of the insert to produce a seating surface thereon;

locating an induction heater adjacent the surface of the insert to be hardened, the heating element of the induction heater being spaced from the surface of the insert; and energizing the heating element from a high frequency alternating current electrical energy source for a period lasting between 0.20–0.60 seconds.

2. The method according to claim 1 wherein the step of fitting the insert in place in the recess comprises:

boring a recess in the second component, the bore having a diameter less than the outside diameter of the insert;

producing a temperature difference between the insert and the second component sufficient to substantially remove the diametrical interference, the second component having a greater temperature than the insert; and installing the insert in the recess.

3. The method according to claim 1 wherein the diametrical interference is in the range between 0.003–0.005 inches.

4. The method according to claim 1 wherein the induction heater is located from the surface of the insert to be hardened a distance in the range 0.030–0.060 inches.

5. The method according to claim 1 wherein the induction heater is energized with electrical energy at a frequency greater than 200,000 cycles per second.

6. The method according to claim 5 wherein the induction heater is supplied with electrical power in the range 20–40 kilowatts.

7. The method according to claim 1 wherein the induction heater is energized with electrical energy at a frequency of approximately 450,000 cycles per second, for a period lasting 0.20–0.50 seconds.

8. The method according to claim 1 wherein the induction heater is supplied with electrical power in the range 20–40 kilowatts for a period lasting 0.20–0.50 seconds.

9. The method according to claim 1 wherein the induction heater is supplied with electrical power in the range 20–40 kilowatts for a period lasting 0.20–0.50 seconds at a frequency greater than 200,000 cycles per second.

* * * * *